June 8, 1965 B. T. MATTHIAS 3,188,530

VANDIUM-TITANIUM COMPOSITION IN A SUPERCONDUCTIVE DEVICE

Filed April 24, 1961

2 Sheets-Sheet 1

INVENTOR
B. T. MATTHIAS

BY George S. Indig

ATTORNEY

INVENTOR
B. T. MATTHIAS
BY George S. Indig
ATTORNEY

United States Patent Office 3,188,530
Patented June 8, 1965

3,188,530

VANADIUM-TITANIUM COMPOSITION IN A SUPERCONDUCTIVE DEVICE

Bernd T. Matthias, Berkeley Heights, N.J., assignor to Bell Telephone Laboratories, Incorporated, New York, N.Y., a corporation of New York Filed Apr. 24, 1961, Ser. No. 104,993
6 Claims. (Cl. 317—158)

Figure 1:
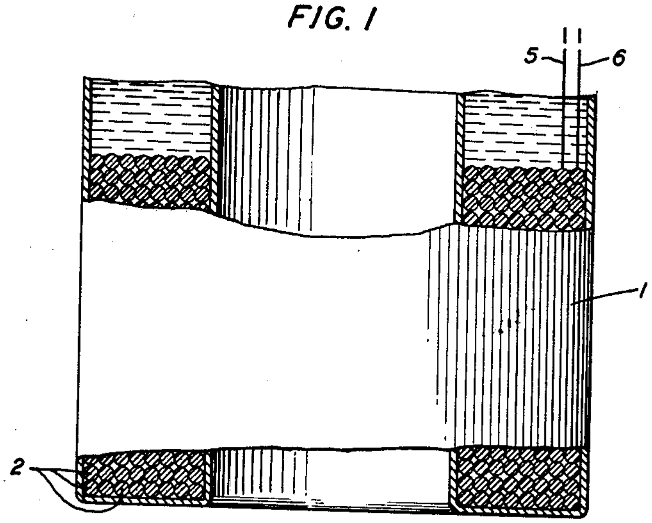

This invention relates to superconducting compositions of the vanadium-titanium system and to devices including members of such compositions.

Although the phenomenon of superconductivity was discovered some fifty years ago, and although it was immediately apparent that the property was potentially important in, for example, the development of loss-free conductive systems and nondissipating magnetic configurations, the intervening years have seen little in the way of a practical realization. Although this was initially due, at least in part, to the difficulty and expense involved in maintaining superconducting materials at temperatures below their transition temperatures (not generally exceeding of the order of about 10 or 11 degrees Kelvin), this difficulty has largely been removed by new development in low temperature apparatus.

Probably a more important limitation on the capabilities of superconducting structures is inherent in the material used. It was early recognized that the superconducting state was incompatible with critical maximum values of applied magnetic field, whether resulting from currents passing through the superconducting elements themselves or externally applied. Such field values, commonly referred to as critical field ($H_c$), decrease for increasing current in the superconducting element and increase for decreasing temperature below the critical temperature, and generally have been found to range about maximum values of the order of about 2–4 kgauss or less for most of the early materials, both elemental and alloy, on which such measurements were made. The maximum value of ($H_c$), of course, imposes an absolute maximum on the field intensity attainable by use of a given superconductive material regardless of configuration.

Recently, the discovery that (H) for the alloy system molybdenum-rhenium attains values as high as 15 kgauss and higher has stimulated a revival of interest in practical devices operating on superconducting principles. Within the past year, a superconducting magnet containing a plurality of turns of Mo-Re was operated at an actual field of over 15 kgauss (see 32 Journal of Applied Physics, 325–6).

From a fabrication standpoint, Mo-Re is an ideal material. It forms an almost perfect solid solution, is virtually strainfree as cast, and is so ductile as to be easily fabricated into wire or other configurations by conventional metallurgical cold-working. It has been recognized that this cold-working is further advantageous in that it improves the current-carrying capacity of the material. However, as important as this demonstration was, particularly from the communication standpoint, it is nevertheless true that fields of this magnitude are attained in conventional conductive solenoid structures without undue heat dissipation problems. The need for superconducting magnet configurations capable of delivering field intensities of the order of 50 kgauss and higher, where the elimination of the heat dissipation problem encountered in conventional structures is serious, remained unsatisfied.

Within the past few months, it was discovered that the superconducting compound $Nb_3Sn$, when prepared in a certain manner, is capable of high currents while withstanding fields of the order of 88 kgauss and higher. As striking as are these newly-discovered properties of $Nb_3Sn$, the inherent brittleness of the material prevents its ready adaptation to wire configurations. In fact, these striking properties were observed in materials produced by reaction of the elements only after the elements had been powdered, mixed, inserted in tubing, worked down to the desired dimensions, and formed into the desired configuration. Current densities of the order of 150,000 amperes/cm.$^2$ and critical fields of the order of 100 kgauss justify this involved sequence of processing steps where there is no competing material that can more easily be formed into the desired configuration. While there is reason to believe that current densities of this magnitude will not easily be obtained in more ductile materials, there would be interest in materials of improved mechanical characteristics capable of withstanding high value of magnetic field even at reduced critical current density. Whereas critical field is an absolute limit on the ultimate field that can be produced in a superconducting coil, the current-carrying capacity can always be increased merely by increasing the diameter of the wire used.

It has been universally accepted that there is an intimate relationship between critical temperature and critical field, it being uniformly observed that the superconducting state is destroyed with lower and lower applied fields in materials evidencing lower and lower critical temperatures. No deviation from this accepted relationship in kind is observed in a comparison of the materials Mo and $Nb_3Sn$, the first evidencing a maximum critical temperature of about 12° K. ($H$=18 kgauss) and the latter evidencing a critical temperature of the order of 18° K. ($H$=88 kgauss). Since ductility and workability, in general, are characteristic of solid solutions rather than compositions, and since critical temperatures higher than that of Mo-Re have been reported only for compounds, it, until recently, seemed unlikely that a ductile material would be found having a value of (H) competing with that of $Nb_3Sn$.

In accordance with the present invention, it has been discovered that alloys of the V-Ti system, even though evidencing maximum critical temperatures less than the Mo-Re system, are capable of withstanding fields of the order of 88 kgauss and greater while in the superconducting state. While the current-carrying capacity of materials of the V-Ti system is significantly lower than that of $Nb_3Sn$, the containing sheathing used in preparing wire configurations of the prior art material is eliminated, so increasing the comparative current-carrying capacity of the new material. Studies thus far conducted have resulted in critical current densities of the order of $10^4$ amperes/cm.$^2$ and higher.

The compositional range of concern is that range intermediate the compositions 10% V-90% Ti; and 90% V-10% Ti; both on atomic percent basis. Wherever reference is made to a composition of the V-Ti system or, more briefly, to V-Ti; such expression should be considered as designating any composition intermediate and including the designated alloys.

Figure 2:
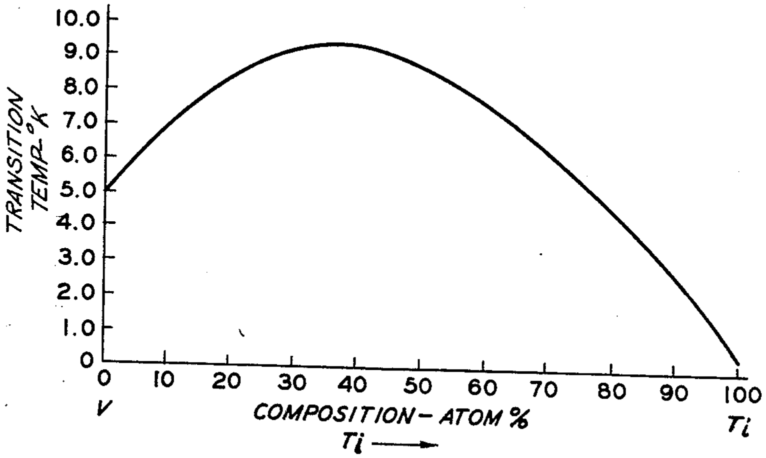
Figure 3:
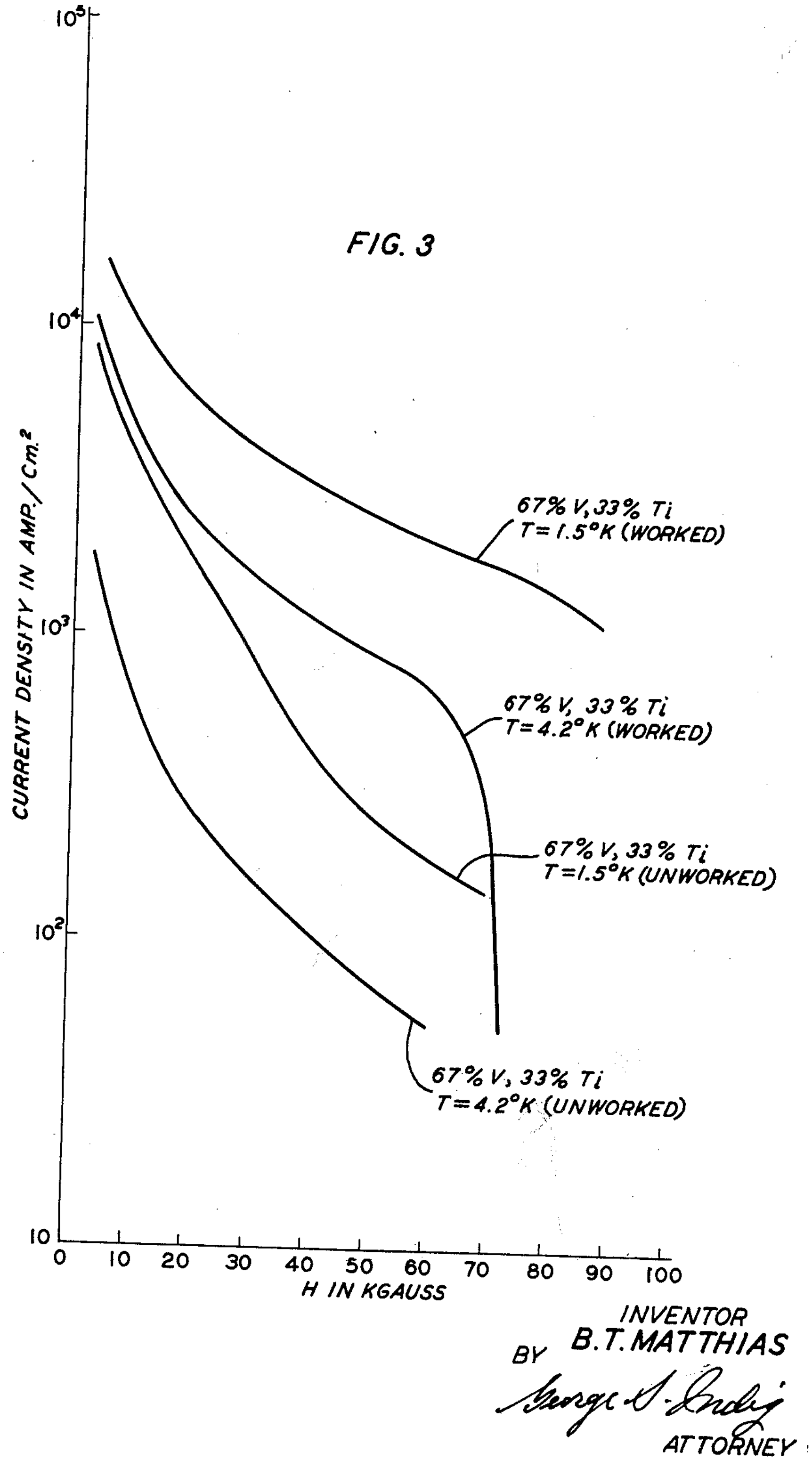

The invention will be more easily understood from the following detailed description, taken in conjunction with the accompanying drawing wherein:

FIG. 1 is a sectional view of a magnetic configuration consisting of an annular cryostat containing several windings of wire of a V-Ti composition in accordance with this invention;

FIG. 2, on coordinates of temperature in degrees K. and composition in atomic percent, is a rectilinear plot showing the relationship between critical temperature and composition for the V-Ti system;

FIG. 3, on coordinates of current density in amperes/cm.$^2$ and magnetic field in kgauss, is a semilog plot showing the relationship between critical current and critical field for the compositions noted.

Referring again to FIG. 1, there is shown an annular cryostat 1 of the approximate dimensions 18″ O.D. by 6″ I.D. by 30″ long filled with liquid helium and containing 4000 turns per centimeter length of V-Ti windings 2. Terminal leads 5 and 6 are shown emerging from the coil. A pumping means, not shown, may be attached to the cryostat so as to permit a temperature variation corresponding with the variation in boiling point of liquid helium and different pressures, the pumping means used in the experimental work described herein permitting regulation of temperature between the values of 1.5° K. and 4.2° K. corresponding with a pressure range of 3.6 mm. of Hg to atmospheric pressure.

As is described, the experimental work resulting in the measured values reported herein made use of a D.C. supply source in series with one or more variable resistors. By this means it was possible to vary the current flowing through the superconducting specimen and, by also adjusting the applied field, to so determine the relationship between critical current and critical field. In actual operation, a solenoid structure such as that shown in FIG. 1, may avoid resistance losses and so obviate the need for a continuous D.-C. source by using an arrangement for shunting the current. Such arrangements are considered well known in the art, conventional circuits as well as certain novel arrangements all usable in conjunction with the instant invention being described in some length in copending U.S. application Serial No. 56,748, filed September 19, 1960, of J. E. Kunzler, now Patent No. 3,129,359. Each of the two techniques has its advantages. Where the magnetic field is to be varied during operation, it is necessary to use a continuous D.-C. source together with a variable resistor or other adjusting means. Where the requirement is for a constant field, optimum efficiency is obtained by use of a shunt. Where extremely high current densities are to be used, it may be unfeasible to use a continuous D.-C. source and other exposed circuitry by reason of the large heat losses.

The readings plotted on FIG. 2 were determined by the standard flux exclusion method utilizing measurements made with a ballistic galvanometer across a pair of secondary coils electrically connected in series opposition, both contained within primary coils. In accordance with this method, the sample is placed within one of the coils and the primary is pulsed with a make-break circuit, for example at 6 volts and 10 milliamperes. An individual primary coil with an air core or containing any nonsuperconducting material evidences no such change insofar as flux is excluded by the superconductor. A non-zero galvanometer reading in a given direction is obtained when the sample placed within one of the secondaries is superconducting. The particular galvanometer used was such that it integrated over a period of approximately a second, an interval adequate to ensure complete penetration of any nonsuperconducting material contained within a secondary coil. Such readings were repeated for each of approximately twelve samples at successively higher temperatures and a zero reading was obtained, so indicating a complete flux penetration and breakdown of the superconducting state.

It is noted from FIG. 2 that the highest critical temperature for the V-Ti system is about 9.5° K., corresponding with a composition of approximately 67% V-33% Ti. Critical temperature values corresponding with limiting compositions 10% V-90% Ti, 90% V-10% Ti are approximately 2.4° K. and 7.0° K., respectively.

The curves of FIG. 3 were plotted from data measured in the following manner: A rectilinear sample 5 mils x 12 mils x ⅞″ was sheared from a worked or unworked body as indicated, copper current leads were attached to the ends, and copper potential leads were attached approximately ¼″ from the ends so as to be separated by approximately ⅜″. The sample was then placed in a cryostat containing liquid helium and was positioned within a solenoid in such manner that the major axis of the sample was normal to the axis of the core of the solenoid. Leads were brought out of the cryostat. The current leads were connected to a 6 volt D.-C. source through a variable resistance. The voltage leads were connected to the input of a Liston-Becker D.-C. Amplifier, the output of which was fed to a Leeds and Northrup type H Speedomax Recorder.

Two reference temperatures were available in the cryostat; the measurements were made at one or the other, or both, as indicated. The first temperature of 4.2° K. corresponds with the boiling point of liquid helium under atmospheric pressure. The second point of 1.5° K. was achieved by maintaining a vacuum of the order of 3.6 mm. Hg over the helium surface. Critical currents for various values of critical field were determined by selecting a desired field value and increasing the current passing through the samples by adjusting the variable resistance until a measureable drop of the order of a few hundredths of 1 microvolt was observed. The solenoid and circuitry involved limit the measurements to a maximum field of 88 kgauss and maximum currents of slightly under 35 amperes. Critical current was generally measured for about ten different corresponding values of critical field.

The ordinate units of FIG. 3 are in terms of critical current density in amperes/cm.$^2$. This is the parameter conventionally used in determining current-carrying capacity of a superconducting sample. It is calculated by dividing the measured current by the cross-sectional area. Of course, it is recognized that this very calculation suggests a current-carrying mechanism which, although strictly accurate for comparing the measurements here reported which were all made on samples of approximately the same cross-section, may not be an accurate basis for comparing samples of varying cross-sectional area. Unworked materials of the V-Ti system may be expected to evidence "soft" superconductivity, that is, it is to be expected that currents flowing in such materials are restricted to a very thin shell of a thickness equal to the penetration depth extending about the entire surface of the configuration. On the other hand, the fact that critical current increases greatly with working (see FIG. 3) indicates that the material is taking on some of the characteristics of a "hard" semiconductor, and that current flow is at least, in part, filamentary. It has been observed experimentally for several systems that the critical current of a "hard" superconductor scales more or less directly with cross-sectional area, while the critical current of a "soft" superconductor scales with a first order of the diameter. The data presented for the worked V-Ti materials is indicative of current density values which may be attained in V-Ti wire of any cross-section assuming the same degree of cold-working. Where for any reason the data presented for the unworked V-Ti materials is to serve as a design criterion, the quantities indicated should be adjusted in accordance with the perimeter of the cross-section.

The curves of FIG. 3 are presented to indicate the characteristic variation of critical current with critical field for the noted compositions in the V-Ti. Curves are presented for a 67% V-33% Ti unworked and worked samples. These curves are plotted from data taken at 1.5° K. and, for a comparison, a 4.2° K. curve for both the worked and unworked materials is presented.

For purposes of this invention, cold-working or reduction is intended to indicate a reduction of at least 60 percent. Since, however, the number of filaments increases with increasing reduction, it is generally desirable to introduce the maximum feasible amount of working. Materials of the V-Ti systems are readily reduced by 90 percent or greater, and this figure represents a minimum preferred degree of working for the purposes of this invention. These limitations are calculated on the usual metallurgical basis, that is, $$\frac{\text{Original cross-sectional area} \\ -\text{final cross-sectional area}}{\text{Original cross-sectional area}} \times 100\%$$

Since the materials utilized herein are not readily available, a suitable technique for their preparation (the one actually used in the described experiments) is presented:

*Preparation of* V-Ti *material*

The desired quantities of elemental metals are weighed out and melted in a button-welding inert arc furnace. The apparatus used consists of a water-cooled copper hearth with a ¾" diameter hemispherical cavity. The cavity, together with contents, acts as a first electrode. A second, nondisposable electrode, also water-cooled, made for example of tungsten, is spaced from the surface of the contents of the cavity (¼" was found suitable). An arc is struck with a high frequency current (0.5 mc. or greater) and is maintained with a D.-C. potential sufficient to bring about melting. For a 10 gram total charge, a 40-volt potential at a spacing of ¼" resulted in a current of about 300 amperes, which was sufficient to bring about melting in a period of about 10 to 15 seconds. Since melting is prevented at the interface between the contents and water-cooled crucible, homogenization is brought about only by turning over the charge and repeating the procedure several times. Five or six repetitions were found adequate in the experiments run.

The following experimental technique was followed in preparing the samples for measurement:

Using a charge of about 10 grams total, button dimensions were approximately ¾" diameter by ⅜" in height. Using an abrasive wheel, the button was first cut into two half circles, after which a slice approximately 15 mils thick was removed parallel to the initial cut. Bars of 15 x 15 mil cross-section and of length equal to the diameter were removed from the slice. The remainder of the half circle from which the half slice was removed was rolled to a strip approximately ¾" wide ¾" long (approximately 97 percent reduction. Electrode contact, spaced as described above, was made by use of supersonic soldering or welding, depending on composition.

It is to be considered that the main contribution made by this invention resides in the discovery that materials of the V-Ti system manifest critical field values significantly greater than would be expected on the basis of critical temperature. Accordingly, it has been shown that V-Ti materials, even though having a maximum critical temperature of 9.5° K. as compared with well over 12° K. for Mo-Re, manifests critical field values of 88 kgauss and higher as compared with a maximum of the order of less than 20 kgauss for the prior art material. All of the data presented in the form of the figures or elsewhere is considered to be of primary significance in demonstrating that V-Ti materials within the broad compositional range of 10% V-90% Ti and 90% V-10% Ti all will show disproportionately high critical fields. Although, as compared with $Nb_3Sn$, the only material reported to show values of H of the order of 88 kgauss, the new materials are limited by much lower maximum critical circuits. Materials of the V-Ti system are advantageous in that they can be rolled and otherwise worked to produce wire configurations by conventional metallurgical techniques.

A preferred compositional range of from 10–80 percent V is based on studies indicating the need for such an alloying ingredient to produce substantial deviation from the superconducting composition of the pure element. Accordingly, addition of substantially less than about 10 percent of V results in a solution having properties more nearly resembling those of pure V. The preferred upper limit of 80 percent corresponds with a composition having a critical temperature of approximately 4.2° K. (boiling point of helium at atmospheric pressure).

In view of the comparisons outline with the ductile material Mo-Re and the brittle Material $Nb_3Sn$, it is to be assumed that the main impact of this invention will be in the construction of superconducting magnets of wire configurations so designed as to result in a field higher than that of the well-known Mo-Re system. In superconducting magnets, as in conventional solenoids, field intensity H is dependent upon the number of turns and current in accordance with the relationship:

$$H=\frac{4\pi ni}{10l}=1.26\ Ni$$

where $H$=field intensity in gauss,
$n$=number of turns,
$i$=current in amperes,
$l$=length in cm., and $$N=\frac{n}{l}\text{ turns/cm.}$$

Certain of the claims are in terms of the Ni product required to produce a field of the order of 30 kgauss or higher, it being assumed that it is in this area that the chief value of the invention lies. Preferred claims are directed to such a product required to bring about a field of at least 60 kgauss.

The invention has been described in terms of a limited number of figures and related text for the sake of expediency. Various modifications on the experimental techniques outlined are apparent.

Also, whereas discussion has been in terms of the superconducting system V-Ti alone, this material may be alloyed with other materials including superconducting solid solutions and compounds to bring about any desired modification in properties.

Other variations and fabricating details are considered within the skill of the artisan skilled in this art and are not specifically set forth. All such modifications are considered to be within the scope of the invention.

What is claimed is:

1. A superconducting magnet configuration comprising a plurality of turns of a material comprising a composition of the V-Ti system consisting essentially of from 10 to 90 atomic percent V and from 90 to 10 atomic percent Ti, together with means for maintaining the said turns at a temperature at least as low as the critical temperature for the said material and with means for introducing a current of such magnitude that the fraction $$\frac{4\pi ni}{10l}$$

equals at least 30 kgauss, where $n$ equals the number of turns, $i$ equals the current in amperes and $l$ equals length in centimeters.

2. A superconducting magnet configuration comprising a pluralty of turns of a material comprising a composition of the V-Ti system consisting essentially of from 10 to 80 atomic percent V and from 90 to 20 atomic percent Ti, together with means for maintaining the said turns at a temperature at least as low as the critical temperature for the said material and with means for introducing a current of such magnitude that the fraction $$\frac{4\pi ni}{10l}$$

equals at least 30 kgauss, where $n$ equals the number of turns, $i$ equals the current in amperes and $l$ equals length in centimeters.

3. A superconducting magnet configuration comprising a plurality of turns of a material comprising a composition of the V-Ti system consisting essentially of 67 atomic percent V and 33 atomic percent Ti, together with means for maintaining the said turns at a temperature at least as low as the critical temperature for the said material and with means for introducing a current of such magnitude that the fraction $$\frac{4\pi ni}{10l}$$

equals at least 30 kgauss, where $n$ equals the number of turns, $i$ equals the current in amperes and $l$ equals length in centimeters.

4. A superconducting device including a composition of the V-Ti system consisting essentially of from 10 to 90 atomic percent V and from 90 to 10 atomic percent Ti together with means for maintaining said composition at a temperature at least as low as its critical temperature and means for producing a field of at least 30 kgauss at least about a portion of said composition.

5. A superconducting device including a composition of the V-Ti system consisting essentially of from 10 to 80 atomic percent V and from 90 to 20 atomic percent Ti together with means for maintaining said composition at a temperature at least as low as its critical temperature and means for producing a field of at least 30 kgauss at least about a portion of said composition.

6. A superconducting device including a composition of the V-Ti system consisting essentially of 67 atomic percent V and 33 atomic percent Ti together with means for maintaining said composition at a temperature at least as low as its critical temperature and means for producing a field of at least 30 kgauss at least about a portion of said composition.

References Cited by the Examiner

UNITED STATES PATENTS 2,754,204 7/56 Jaffee et al. ____________ 75—174

FOREIGN PATENTS 718,882 3/42 Germany.
771,390 4/57 Great Britain.

OTHER REFERENCES

Autler: "Superconducting Electromagnets," The Review of Scientific Instruments, vol. 31, No. 4, pp. 369–373, April 1960.

De Jong: "General Crystallography," W. H. Freedman and Company, San Francisco, 1959, p. 149.

Von M. V. Laue: "Supraleitung und Kristallklasse," Annalen der Physik, Folge 6, Band 3, pp. 40–42, 1948.

Burton: "Superconductivity," The University of Toronto Press, Toronto, Canada, 1934, pp. 50, 53 and 58.

JOHN F. BURNS, *Primary Examiner.*

SAMUEL BERNSTEIN, *Examiner.*